(12) United States Patent
Bellavich

(10) Patent No.: US 6,823,595 B1
(45) Date of Patent: Nov. 30, 2004

(54) TABLE TOP X-Y CARRIAGE FOR USE WITH QUILTING FRAME

(76) Inventor: Ronald C Bellavich, 445 Surveyors Point, Suwanee, GA (US) 30024

(*) Notice: Subject to any disclaimer, the term of this patent is extended or adjusted under 35 U.S.C. 154(b) by 0 days.

(21) Appl. No.: 10/424,900

(22) Filed: Apr. 28, 2003

Related U.S. Application Data

(60) Provisional application No. 60/377,384, filed on May 3, 2002.

(51) Int. Cl.[7] .......................... B23Q 16/00; D05B 11/00
(52) U.S. Cl. ......................... 33/1 M; 33/568; 112/119
(58) Field of Search ...................... 33/1 M, 568, 569, 33/573; 112/117–119

(56) References Cited

U.S. PATENT DOCUMENTS

| | | | | |
|---|---|---|---|---|
| 4,802,494 A | * | 2/1989 | Gardiner | 33/512 |
| 4,953,485 A | * | 9/1990 | Brower et al. | 112/119 |
| 5,095,835 A | * | 3/1992 | Jernigan et al. | 112/119 |
| 5,105,552 A | * | 4/1992 | Bielle | 33/573 |
| 5,148,612 A | * | 9/1992 | Walser et al. | 33/784 |
| 5,189,805 A | * | 3/1993 | Matsumoto et al. | 33/503 |
| 5,711,236 A | * | 1/1998 | Badger | 112/117 |
| 5,886,494 A | * | 3/1999 | Prentice et al. | 318/625 |
| 5,888,268 A | * | 3/1999 | Bando | 33/1 M |
| 5,913,275 A | * | 6/1999 | Flynn | 112/119 |
| 6,328,510 B1 | * | 12/2001 | Hanrath et al. | 33/1 M |
| 6,434,840 B1 | * | 8/2002 | Jourtchenko et al. | 33/1 M |
| 6,772,703 B2 | * | 8/2004 | Filges et al. | 112/66 |

* cited by examiner

Primary Examiner—Christopher W. Fulton
Assistant Examiner—Yaritza Guadalupe

(57) ABSTRACT

A low profile, single platform carriage (40) for use with a quilting frame that is capable of simultaneous motion in two orthogonal axes, capable of motion along the length of a table without the need for guidance systems such as tracks or channels, for enhanced portability with a simple means of adjustment (20) for the length of the carriage in the y-axis for the purpose of accommodating slight variations in standard table width.

2 Claims, 4 Drawing Sheets

TABLE TOP X-Y CARRIAGE FOR USE WITH QUILTING FRAME

CROSS-REFERENCE TO RELATED APPLICATIONS

This application claims benefit of PPA Ser. No. 60/377,384, filed May 3, 2002 by the present inventor.

BACKGROUND

1. Field of Invention

This invention relates to a platform for the use of a sewing machine when used as part of a quilting system 2. Background of the Invention The present invention relates to a trackless, single platform sewing machine carriage capable of simultaneous movement in two orthogonal directions for carrying a sewing machine when used as part of a machine quilting system.

A known type of sewing machine carriage used in machine quilting generally consists of two platforms, one for each axis of motion. This type of platform requires the use of a track system for the lower platform, which provides guidance for the platform along the length of the table. The track system attaches to the top of a table by means of tape, glue or more intrusive fastening devices such as screws. The sewing machine rests on the top platform, which moves along tracks or channels in the bottom platform at an angle perpendicular to the movement of the bottom platform.

Another type of sewing machine carriage uses a bottom platform similar to the previously described platform, but uses wheels directly attached to the sewing machine for movement perpendicular to the bottom platform.

Yet another type of sewing machine carriage uses a special table top with channels cut into it for guidance along the length of the table.

A disadvantage to these types of sewing machine carriages is that they require a track system, or more intrusive approaches such as channels cut into the top of a table, for guidance along the length of a table. The requirement for a separate guidance system reduces the portability of these systems. Intrusive modifications to a table top for the purpose of providing a guidance system reduces the use of the table for other purposes.

Another disadvantage associated with these sewing machine carriages is the two platform system. The use of two platforms increases the height of the carriage and reduces portability due to the to the bulkiness of the carriage system.

SUMMARY

Figure 1:
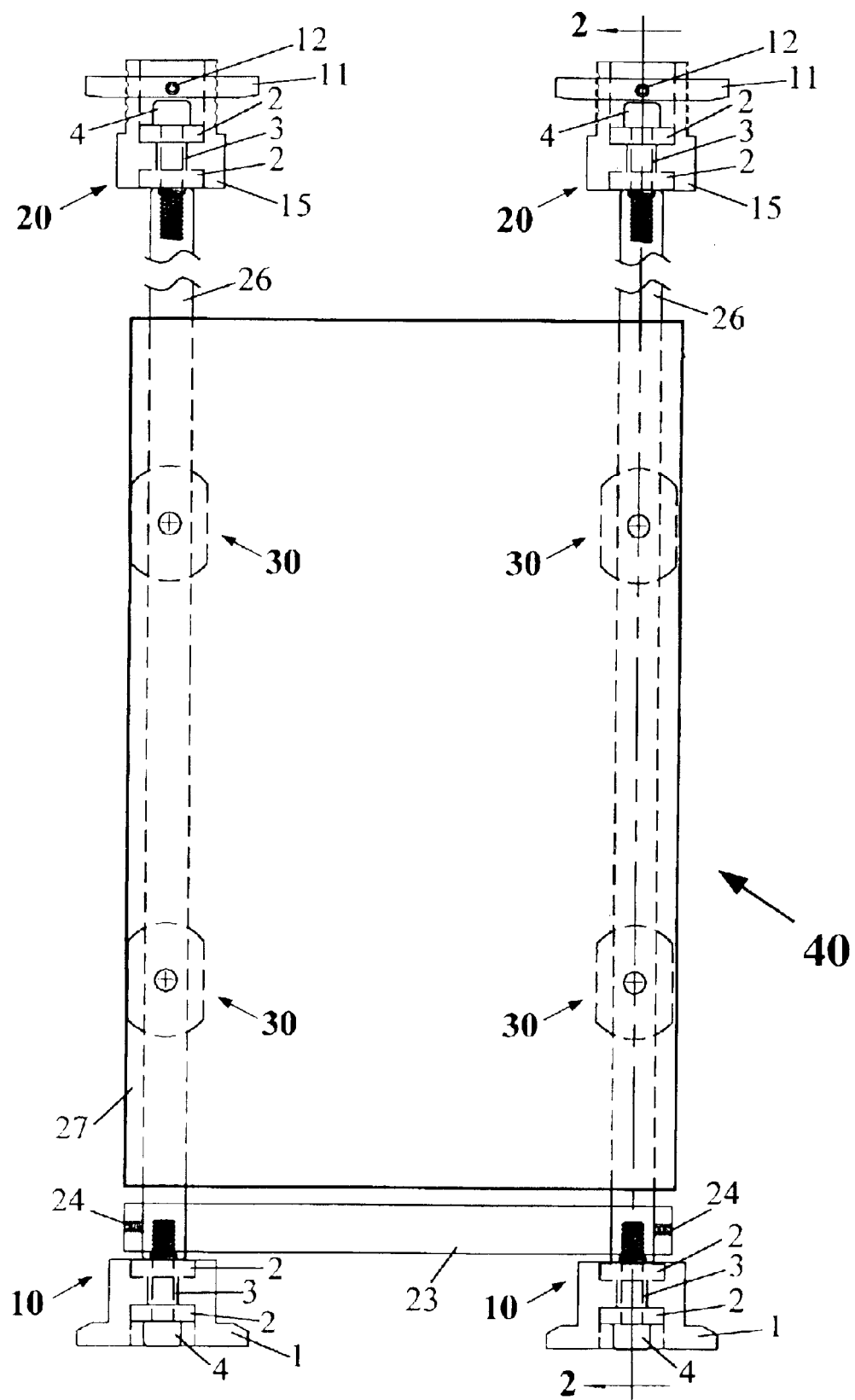
FIG. 1 is a plan view of the X-Y axis carriage of the present invention.

An object of the present invention is to provide a low profile, single platform carriage capable of simultaneous motion in two orthogonal axes. Another object of the invention is to provide a carriage capable of motion along the length of a table without the need for intrusive guidance systems such as tracks or channels, for enhanced portability.

Yet another object of the invention is to provide a carriage with a simple means of adjustment for the length of the carriage in the Y-axis for the purpose of accommodating slight variations in standard table width.

DESCRIPTION

The X-Y carriage of the present invention is generally designated by reference numeral 40 and includes two linear shafts 26 which are oriented in parallel relation. Four linear bearing assemblies 30 provide support to platform 27. The linear bearing assemblies 30 glide along the linear shafts 26 providing low friction motion of platform 27 across the table (the Y-axis for purposes of discussion). Each linear shaft 26 is supported by wheel assembly 10 on one end and wheel assembly 20 on the other end. The wheel assemblies 10 and 20 provide motion for the platform in the direction perpendicular to the linear shafts (the X-axis for purposes of discussion), along the length of the table.

FIG. 1 is a plan view of the X-Y carriage 40 in accordance with this invention. The sewing machine is placed on platform 27. Platform 27 can be fabricated from any material capable of supporting the weight of the sewing machine. Linear bearing assemblies 30, gliding on linear shafts 26, support platform 27. Each linear shaft 26 passes through a pair of axially aligned linear bearing assemblies 30. The linear shafts 26 are linked together by stabilizer bar 23. Wheel assemblies 10 and 20 are attached to the ends of the linear shaft 26 by bolt 4. Wheel assembly 10 is of fixed length, while wheel assembly 20 is adjustable in length to compensate for variations in standard table widths.

Figure 2:
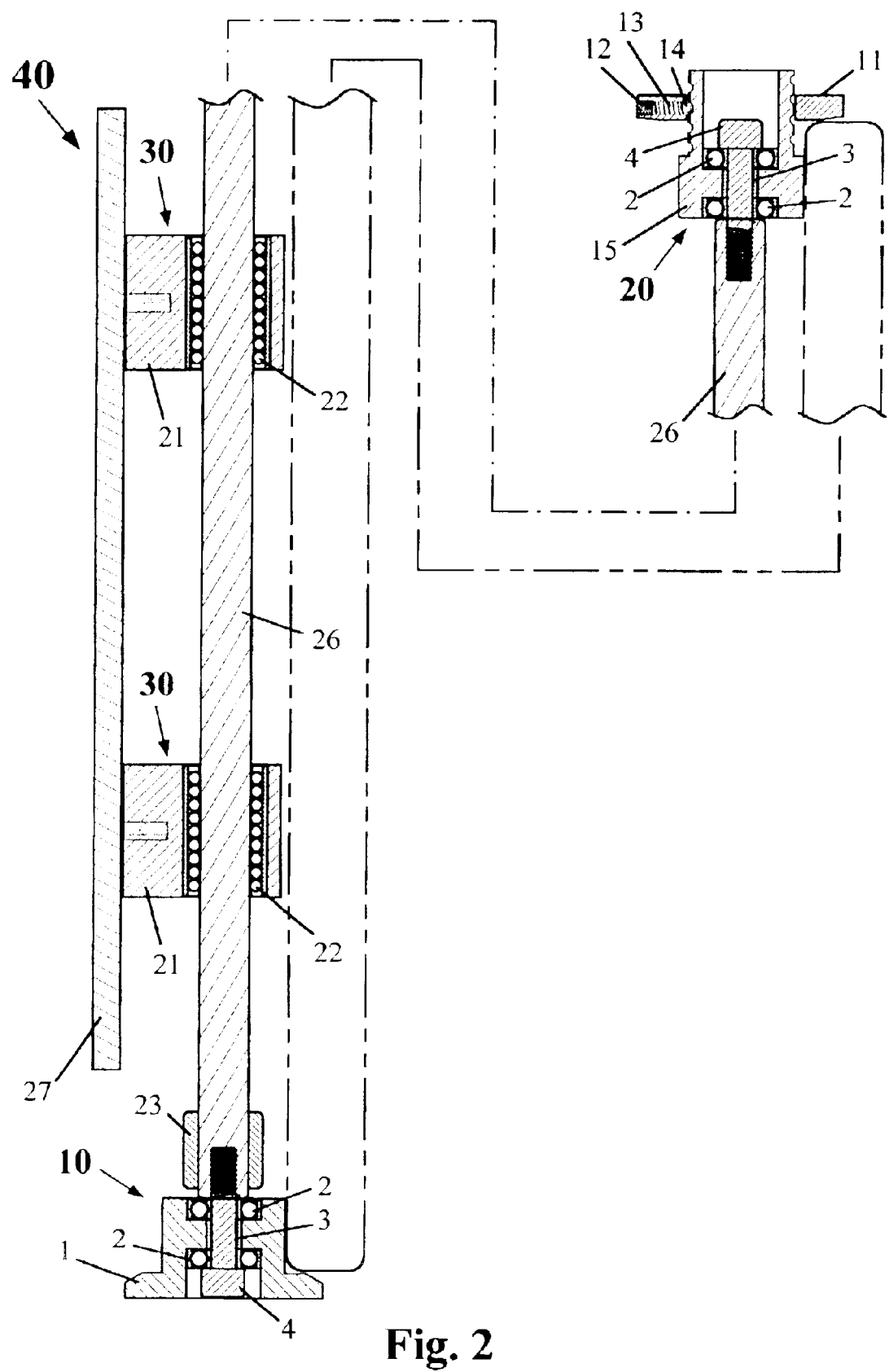
FIG. 2 is an enlarged sectional view taken along section line 2 on FIG. 1, illustrating structural details as well as illustrating how the carriage rests on top of a table.

FIG. 2 is a sectional view taken along section line 2 of FIG. 1, illustrating how the carriage rests on top of a table. As illustrated in FIG. 2, the skirts of wheel assemblies 10 and 20 hang over the edge of the table for guidance along the X-axis of motion.

Figure 3:
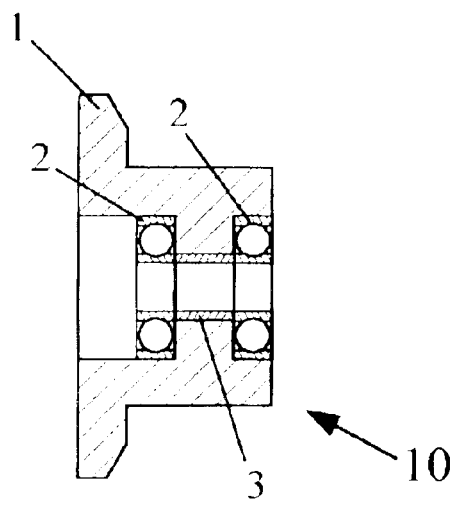
FIG. 3 is a sectional view of wheel assembly 10, illustrating structural details of the wheel assembly.

FIG. 3 illustrates details of the fixed wheel assembly 10. In this context, the term fixed refers to wheel body 1 being one piece having a flared skirt portion, for providing guidance along a table or rail edge, that is not adjustable. The wheel body 1 contains two ball bearings 2 separated by spacer 3.

Figure 4:
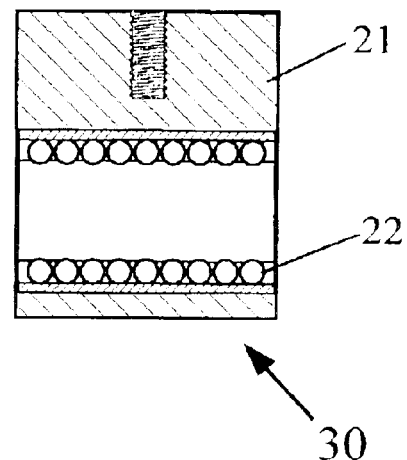
FIG. 4 is a sectional view of linear bearing assembly 30, illustrating structural details of the linear bearing assembly.

FIG. 4 illustrates the linear bearing assembly 30. The linear bearing assembly 30 attaches to the platform 27, providing support. The linear bearing assembly 30 consists of housing 21, containing linear ball bearing 22, which allows for low friction motion along the linear shaft 26 in the Y-axis.

Figure 5:
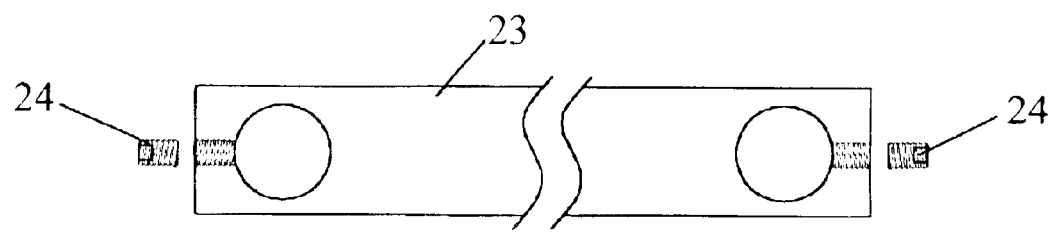
FIG. 5 is an elevation view of the side of the stabilizer bar 23.

FIG. 5 illustrates the stabilizing rod 23 which links both shafts 26 together, fixing the relative motion of the shafts with locking screw 24.

Figure 6:
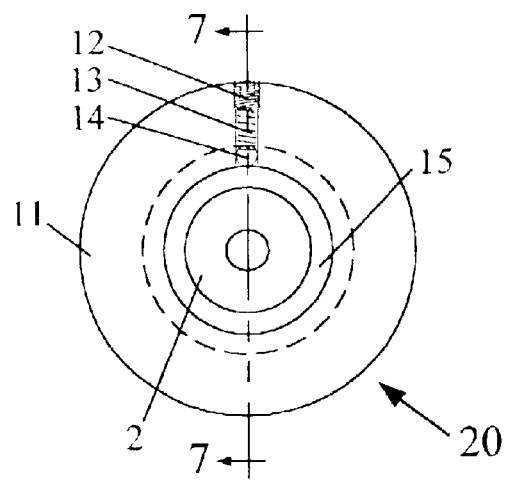
FIG. 6 is an elevation view of the outer surface of wheel assembly 20.
Figure 7:
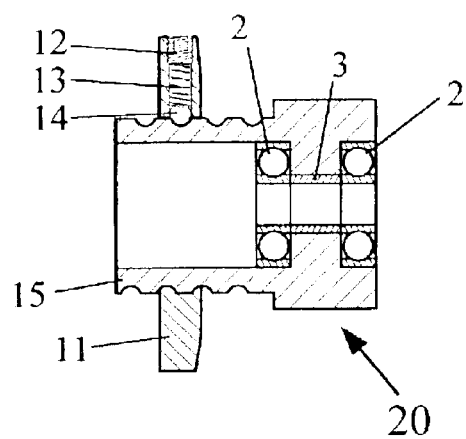
FIG. 7 is a sectional view taken along section line 7 on FIG. 6, illustrating structural details of wheel assembly 20.
Figure 8:
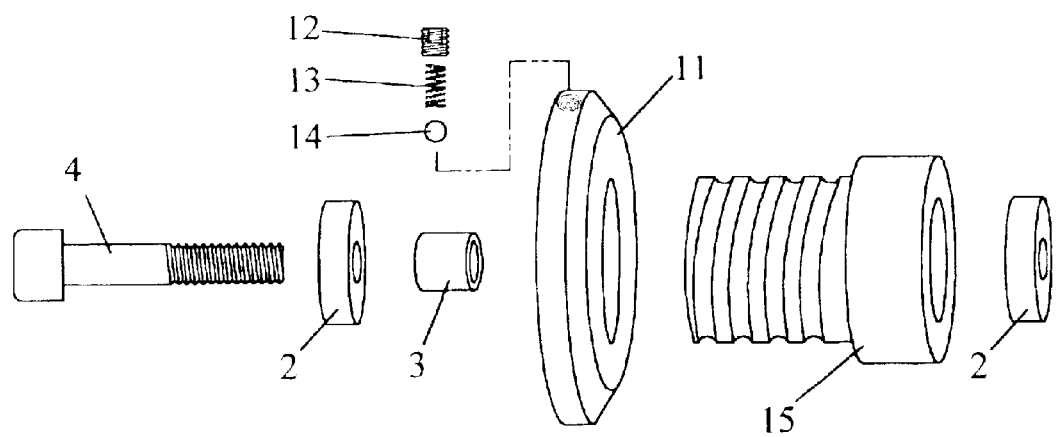
FIG. 8 is an exploded view of wheel assembly 20.

FIGS. 6, 7 and 8 illustrate the adjustable wheel assembly 20. The wheel body 15 contains two ball bearing assemblies 2 separated by spacer 3. The body 15 is grooved in a spiral pattern along a portion of its length. Ball 14, adjustable in skirt 11, is engaged with the groove, allowing the adjustable skirt 11 to be rotated for proper adjustment. The adjustable skirt 11 is held in place at the desired position by pressure provided by spring 13 aginst ball 14, on the wheel body 15 as the adjustable skirt 11 is rotated relative to the wheel body 15. Spring 13 and ball 14 are held in adjustable skirt 11 by set screw 12.

| | | | |
|---|---|---|---|
| 1. | Fixed wheel body | 20. | Adjustable wheel assembly |
| 2. | Ball bearing | 21. | Linear bearing housing |
| 3. | Spacer | 22. | Linear bearing |
| 4. | Bolt | 23. | Stabilizing rod |
| 10. | Fixed wheel assembly | 24. | Locking screw |
| 11. | Adjustable Skirt | 26. | Linear shaft |
| 12. | Set Screw | 27. | Platform |
| 13. | Spring | 30. | Linear bearing assembly |
| 14. | Ball | 40. | Complete platform system |
| 15. | Adjustable wheel body | | |

Operation

The carriage 40 is placed across a standard width table (example: 30") for which it is designed, in such a way that the skirts of wheel assemblies 10 and 20 hang over the edges of the table, as illustrated in FIG. 2. The adjustable skirt 11 of each adjustable wheel assembly 20 is then rotated relative to the wheel body 15 in such a manner that a small amount of end play (clearance) is observed between the table edge and the adjustable skirt 11 with the carriage 40 resting on the table. When the desired amount of end play is set for both adjustable wheels 11 and the carriage is resting on top of the table, place the sewing machine on top platform 27.

Due to the slight variations in width of standard tables, when placing carriage 40 on a different table of the same standard width, it may again be necessary to perform the adjustment of adjustable skirt 11. The same adjustment process can be performed when placing carriage 40 on a rail system.

What is claimed is:

1. An X-Y axis carriage providing simultaneous motion in two orthogonal axes across a table top, comprising a platform resting on linear bearing assemblies which are mounted on two parallel shafts, providing movement in one axis along the parallel shafts, said shafts attached at opposite ends to wheel assemblies having skirts that overhang the edges of the surface of a table, providing guidance along the table in a direction perpendicular to the motion of the platform along the shafts.

2. An X-Y axis carriage according to claim 1, having wheel assemblies with skirts that are adjustable in such a manner as to increase or decrease distance of said skirts from the table edge, providing adjustment of table edge clearance.

* * * * *